March 25, 1969  H. HOLZMANN  3,434,826
RECOVERY OF NOBLE METALS WHICH ARE VOLATILIZED
DURING CATALYTIC REACTIONS
Filed Oct. 4, 1965
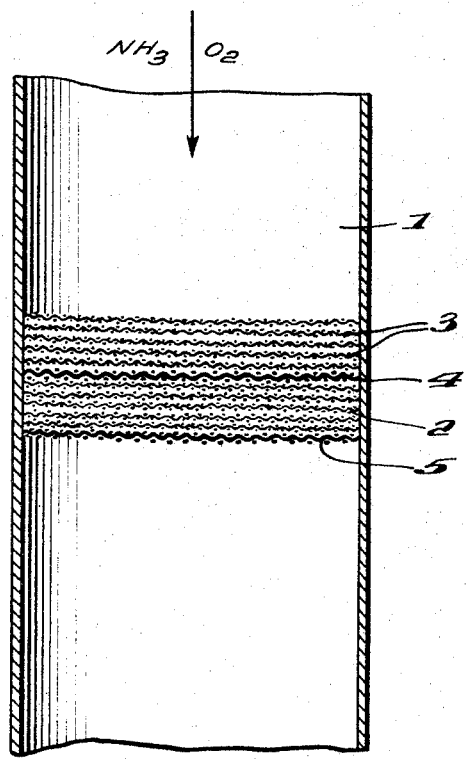
INVENTOR
HERMANN HOLZMANN
BY Bailey, Stephens & Huettig
ATTORNEYS

United States Patent Office 3,434,826
Patented Mar. 25, 1969

3,434,826
RECOVERY OF NOBLE METALS WHICH
ARE VOLATILIZED DURING CATALYTIC
REACTIONS
Hermann Holzmann, Hanau am Main, Germany, assignor to Deutsche Gold- und Silber-Scheideanstalt vormals Roessler, Frankfurt am Main, Germany
Filed Oct. 4, 1965, Ser. No. 492,545
Claims priority, application Germany, Oct. 3, 1964,
D 45,559
Int. Cl. C22b *11/02*
U.S. Cl. 75—83    5 Claims

ABSTRACT OF THE DISCLOSURE

Platinum which is volatilized during high temperature catalytic reactions is recovered by contacting the highly heated gas stream leaving the catalyst while the volatilized platinum contained therein is still essentially in the gaseous phase with a foraminate element of a metallic material selected from the group consisting of palladium and palladium-gold alloys at a temperature of at least 850° C.

---

The present invention relates to a process for the recovery of noble metals which are volatilized during high temperature catalytic reactions with platinum, platinum metal, or platinum metal alloy catalysts, such as, for example, during catalytic ammonia oxidation, especially at gauge pressures of 2–9 atmospheres and during the Andrussow hydrocyanic acid synthesis.

The problem of the recovery of the volatilized noble metals occurring during the catalytic oxidation of ammonia with platinum or platinum alloy catalysts is practically as old as the ammonia oxidation process itself as in such catalytic oxidation, which preferably is carried out with platinum/rhodium netting catalysts, losses of costly platinum and rhodium continuously occur, which losses are engendered by a volatilization of these metals although the causes for such volatilization which seldom occur in catalytic reactions have not been completely clarified. Such losses through volatilization also occur in other catalytic reactions carried out on platinum metals at high temperatures, such as, for example, in the Andrussow hydrocyanic acid synthesis. As a consequence, there has been no lack of attempts to hold back and recover at least a portion of the costly noble metal with suited processes and apparatus.

The use of mechanical filter materials, such as, asbestos fibers, quartz, glass and base metal wool or so-called impingement bodies, for instance, in the form of gold coated porcelain rings, for the recovery of the volatilized noble metals is, for example, known. These mechanical recovery means have the disadvantage that either they only effect recovery of a small portion of the noble metal or that the cost for the recovery of the noble metal is unfavorable when considered on the basis of the value of the noble metal recovered. In addition, they cause a noticeable decrease in pressure in the oxidation apparatus.

Furthermore, the use of so-called trapping nettings constructed of a cheaper noble metal than that to be recovered or of a base metal, for example, coated with gold for the recovery of the volatilized noble metals is also known. With these nettings, a certain impingement action is also relied upon, such nettings being held at a temperature substantially below that of the catalyst nettings.

Thick layers of non-metallic impingement bodies such as, for example, of granular marble, held by scaling resistant base metal wire nettings, have also been provided directly behind the catalyst nettings. For the economy of this process it was more favorable if the collecting arrangement was not arranged directly behind the catalyst but rather in a temperature zone of only 600–750° C. as in such case it is possible to reduce the thickness of the layers of granular marble. The primary disadvantage of this procedure is the sensitivity to moisture of the collecting mass.

Glass wool now only finds occasional use in the so-called pressureless plants for ammonia oxidation in which the feed $NH_3$/air mixture, as well as gases leaving the catalyst, such as nitrogen oxides, $N_2$, $O_2$ and steam, are practically at atmospheric pressure.

All of these previously known processes for the recovery of the escaping noble metals have the common characteristic that their object is to retain the noble metal particles carried along by the gas stream by a filtering action of the collecting layers, either by porous masses which act as mechanical filters or by impingement bodies upon which the particles impinge and adhere at the working temperature employed. It was always believed that in the use of wire nettings, the wire thickness, type of weave and mesh number per $cm.^2$, and especially the ratio of the free gas passages to the entire netting area in the sense of providing as nearly as possible a 100% impingement action, were of decisive importance for the collecting action. Furthermore, in the past the effort was always made to place the recovery arrangement at a location in the catalytic apparatus at which the temperature was not higher than 800° C. and in some instances a special cooling was provided to provide a temperature of only about 600° C.

According to the invention it was unexpectedly found that the noble metal volatilized during high temperature catalytic reactions with the aid of catalysts of platinum, platinum metals or their alloys and especially during ammonia oxidation could be recovered in a technically simple manner over long periods of operation and with favorable recovery ratios if the platinum entrained with the gas stream leaving the catalyst is collected by a getter action while it still is completely or essentially in the vapor phase rather than by mechanical collection only after condensation to particles which are carried along by the gas stream.

The effectiveness of the process according to the invention is assured if the getter bodies are provided as close as possible behind the last catalyst netting, preferably not spaced more than 10 mm. therefrom, and/or is arranged in a zone in which the temperature is not more than 50° C. different from that of the last catalyst net. Accordingly, in high pressure processes, an especially advantageous embodiment of the process according to the invention is attained when the getter bodies are maintained at a temperature of at least 850° C.

The getter bodies or getter materials are advantageously employed according to the invention in the form of foraminate materials such as wire nettings. Plate sieves, perforated plates or expanded metal are to be considered equivalent to the wire nettings. It, however, also is possible to provide the getter material in the form of sufficiently thick coatings, for instance, of more than $10\mu$ on carrier bodies of, for example, $Al_2O_3$.

It is especially advantageous if the catalyst nettings in the oxidation furnace are not spaced more than 10 mm. ahead of the collecting nettings, the two types of netting being separated from each other by a scaling resistant netting and the collecting nettings taken as a whole being supported mechanically by a scaling resistant netting arranged on the downstream side thereof.

The noble metals are especially suited as getter materials for collecting the platinum vapors entrained by the gas stream leaving the catalyst as they possess sufficient mechanical strength at the temperatures presently used as oxidation temperatures for the ammonia/air mixtures, as well as sufficient corrosion resistance against the aggressive components of the gas mixture leaving the catalysts, especially against oxygen and nitric oxide. Accordingly the surfaces of the getter materials remain substantially unchanged so that the getter action upon the platinum vapor carried along by the gas mixture is maintained over long periods of operation. It is important, however, that the noble metals employed as getter materials alloy with the platinum taken up thereby and especially can form mixed crystals therewith and therefore are able to take up larger quantities of platinum, as the platinum is not only held at the surface but rather can diffuse to the center of the getter body so that effective getter substance is always available at the surface of the getter body. High temperatures increase the diffusion velocities and are for this reason also advantageous for the process according to the invention.

Palladium or palladium rich alloys, preferably in the form of nettings, for example, can be employed as getters according to the invention. Palladium is marked by an extraordinarily high recovery quota for platinum which is not reached by any other noble metal.

It is expedient to delay the embrittlement of palladium getter elements by the addition of other elements, for example, by the addition of small quantities of nickel, chromium, manganese, silicon, carbon, boron and/or oxidic compounds. Also, an addition of gold in quantities up to 40% increases the life of palladium nettings.

However, palladium does have a certain disadvantage in that, while it has excellent platinum recovery properties, it itself is somewhat volatile so that palladium losses occur which can be detrimental to the economy of a process operating with a palladium getter.

As gold, in contrast to palladium, does not suffer losses while taking up platinum, it may often be more economical to employ gold or gold rich noble metal alloys as the getter material instead of palladium, even though the getter activity and the ability to recover platinum per unit of surface area of these materials is not as good as those of palladium. This lower ability to recover platinum, however, can be compensated for by increasing the number of getter bodies, for instance, nettings, provided behind the catalyst and also by the fact that they may be used over longer periods of time than is possible with palladium getters. Getter bodies of gold alloys containing additions of platinum metals, especially of up to 20% of platinum and of up to 50% of palladium have the advantage that such additions increase the mechanical strength of the getter bodies.

Additions of base metals have also been found to be advantageous as they, for example, increase the mechanical strength and the melting point of the gold or gold alloys and at the same time suppress the grain growth at high temperatures to a far-reaching degree. Suitable base metal additions either singly or in combination, for instance, are chromium, nickel or manganese in quantities of about 0.1 to 8%, titanium in quantities of about 0.1 to 2% and zirconium in quantities of about 0.1 to 2%.

Additions of chemical compounds such as oxides which are incorporated in the gold, the palladium or their alloys but are not taken up therein in the form of mixed crystals have a similar effect. With such oxides as $Al_2O_3$ or $Cr_2O_3$ the upper limit of such addition is about 1%.

In addition there are some base metals which have a greater affinity for platinum than for oxides. Examples thereof in particular are tantalum, niobium and thorium. These metals avidly take up platinum at high temperatures and therefore are especially suited as additions to gold, palladium or their alloys. Preferably, they are added, individually or in combination, in quantities up to 40% to the gold, the palladium or their alloys, but the total base metal content should not exceed 70%. Palladium/tantalum alloys have especially good processing properties.

Furthermore, scaling resistant base metals, such as, nickel, and their alloys, for example, those of iron-chromium-nickel, iron-chromium and especially iron-chromium-aluminum and nickel-chromium are suited as getter materials. As the surface oxide layers formed thereon are so thin the diffusion of the platinum collected by the getter action into the interior of the getter bodies is not hindered to any extent worth mentioning.

All of the getter substances mentioned will in addition to platinum also collect rhodium.

In the interest of obtaining as intensive a getter action as possible, it is expedient to increase the surface area of the collecting nettings in the direction of the gas stream by arranging a plurality of nettings behind each other. The use of separatory nettings of scaling resistant base metal alloys is, in general, not necessary. To the contrary it is desirable for the getter nettings to weld together at their points of contact at the high operating temperatures concerned and thereby improve the mechanical strength of such a packing of nettings. This is of especial advantage for increasing the time the getter nettings can be maintained in operation and therefore the economy of the process according to the invention. This embodiment has been found especially advantageous when thick wires and a low mesh number are employed in the getter nettings.

An expedient modification of this embodiment is that getter bodies, especially nettings of different getter material, are arranged behind each other. Such combinations, for instance, are four nettings of Pd and one netting of Pd/Au 80/20 or four nettings of AuPt 90/10 between one outer netting each of Pd/Au 80/20.

The accompanying drawing shows a cross-section of a catalytic ammonia oxidation furnace embodying the invention.

The process of the invention is illustrated by the following examples.

Example 1

A number of spaced individual wires of Pd/Au 80/20 were arranged 4 mm. below the Pt/Rh nettings 1170 mm. in diameter serving as catalyst in an ammonia oxidation plant operating at 7 atmospheres gauge pressure and separated therefrom only by a coarse meshed netting of a scaling resistant base metal alloy whereby the Pd/Au wires could practically assume the temperature of 930° C. existing at the Pt/Rh nettings. After 50 days' operation the Pd/Au wires had undergone a 35.1% increase in weight with reference to their starting weight because of the take up of Pt and Rh from the gases leaving the catalyst nettings.

In a comparative test where the Pd/Au wires were placed in the gas stream leaving the catalyst nettings at a point removed 400 mm. therefrom in a cooler zone of about 800° C., the maximum working temperature previously employed for Pt recovery processes with the aid of nettings, the Pd/Au wires only gained 5.1% in weight after 50 days' operation.

These tests clearly indicate the magnitude of the getter effect provided by the noble metal wires on the Pt vapor in the first instance, whereas in the second instance, platinum particles had already been formed which practically could not be retained by the individual wires which only have a low impingement surface action.

Example 2

As shown in the accompanying drawing, 6 Pd nettings 2 of linen weave with 1024 meshes/cm.$^2$ and a wire diameter of 0.09 mm. were arranged 4 mm. behind the catalytic Pt/Rh nettings 3 in an ammonia oxidation furnace 1 1,170 mm. in diameter operating at a gauge pressure of 7 atmospheres. The collecting Pd nettings 2 were separated from the Pt/Rh nettings by a coarse meshed netting 4 of a scaling resistant Ni/Cr alloy and were supported mechanically on their downstream side upon a coarse meshed netting 5 also of a scaling resistant Ni/Cr alloy. After 50 days' operation of such furnace the Pt and Rh losses from the catalytic nettings amounted to 1,152.4 g.

The six collecting nettings during the same time had taken up the following quantities of Pt and Rh:

| Netting | Pt/Rh take up, g. | Recovery, percent |
|---|---|---|
| 1 | 357.2 | 31.0 |
| 2 | 244.3 | 21.2 |
| 3 | 170.6 | 14.8 |
| 4 | 118.7 | 10.3 |
| 5 | 79.5 | 6.9 |
| 6 | 55.3 | 4.8 |
| Total | 1,025.6 | 89.0 |

Example 3

Analogously to Example 2, 8 linen weave nettings of Au/Pt 90/10 with 1024 meshes/cm.$^2$ and a wire diameter of 0.09 mm. were arranged as the collecting nettings 6 mm. behind the catalytic Pt/Rh nettings. In this instance the catalytic nettings lost 1,267 g. of Pt and Rh during 55 days' operation. During this period the 8 collecting nettings had taken up the following quantities of Pt and Rh:

| Netting | Pt/Rh take up, g. | Recovery, percent |
|---|---|---|
| 1 | 230.9 | 18.21 |
| 2 | 187.2 | 14.77 |
| 3 | 154.0 | 12.15 |
| 4 | 127.0 | 10.02 |
| 5 | 102.7 | 8.10 |
| 6 | 85.2 | 6.72 |
| 7 | 67.8 | 5.35 |
| 8 | 56.4 | 4.45 |
| Total | 1,011.2 | 79.77 |

Example 4

Analogously to Example 2, 8 linen weave nettings of an alloy of 22% Cr, 5% Al, remainder Fe with 1024 meshes/cm.$^2$ and a wire diameter of 0.09 mm. were arranged as the collecting nettings 2 mm. behind the catalytic Pt/Rh nettings. In this instance the catalytic nettings lost 832.6 g. of Pt and Rh during 36 days' operation. During this period the 8 collecting nettings had taken up the following quantities of Pt and Rh.

| Netting | Pt/Rh take up, g. | Recovery, percent |
|---|---|---|
| 1 | 127.5 | 15.31 |
| 2 | 106.7 | 12.85 |
| 3 | 92.8 | 11.14 |
| 4 | 76.2 | 9.15 |
| 5 | 65.9 | 7.92 |
| 6 | 54.5 | 6.54 |
| 7 | 47.6 | 5.71 |
| 8 | 40.1 | 4.81 |
| Total | 611.0 | 73.43 |

I claim:
1. A process for the recovery of platinum lost by volatilization from a platinum containing catalyst to a high heater gas stream contacted therewith in a high temperature gas reaction carried out at temperatures above 850° C. which comprises contacting such highly heated gas stream, after its contact with said catalyst, which contains the volatilized platinum while such volatilized platinum is still essentially in the vapor phase and at a temperature of at least 850° C. with a foraminate metallic element consisting essentially of a metallic material selected from the group consisting of palladium and palladium-gold alloys containing up to 40% of gold.

2. The process of claim 1 in which the foraminate element is at most spaced 10 mm. downstream from the catalyst.

3. The process of claim 2 in which the foraminate element is maintained at a temperature not more than 50° C. below that of the catalytic gas reaction.

4. The process of claim 1 in which the catalytic reaction is a catalytic ammonia oxidation carried out under a gauge pressure between 2 and 9 atmospheres.

5. The process of claim 1 in which said foraminate element comprises at least one wire netting of said metallic material, disposed transverse to the direction of the gas stream contacted therewith.

References Cited

UNITED STATES PATENTS

| 2,302,725 | 11/1942 | Uschmann | 75—20 |
| 2,648,393 | 8/1953 | Holzmann | 75—135 |
| 2,730,189 | 1/1956 | Holzmann | 75—135 |
| 2,747,679 | 5/1956 | Ruthardt | 75—135 |
| 2,920,953 | 1/1960 | Rudorfer | 75—83 X |
| 3,303,020 | 2/1967 | Clement et al. | 75—83 |

L. DEWAYNE RUTLEDGE, *Primary Examiner.*

H. W. TARRING, *Assistant Examiner.*

U.S. Cl. X.R.

23—1, 196; 75—135